United States Patent [19]

Fields

[11] 4,122,596
[45] Oct. 31, 1978

[54] MAGNESIUM DIE-CAST BRAKE MASTER CYLINDER

[75] Inventor: Everett H. Fields, Livonia, Mich.

[73] Assignee: Ford Motor Company, Dearborn, Mich.

[21] Appl. No.: 839,708

[22] Filed: Oct. 5, 1977

[51] Int. Cl.$^2$ .......................................... B22D 11/126
[52] U.S. Cl. .................................. 29/527.2; 29/527.3; 29/527.5; 164/113; 164/100; 164/101; 164/102; 164/103; 164/111; 164/112
[58] Field of Search .................. 29/527.2, 527.3, 527.5; 164/91, 103, 104, 105, 106, 113, 112, 111, 100, 101, 102

[56] References Cited

U.S. PATENT DOCUMENTS 3,098,270  7/1963  Bauer .................................... 164/103

*Primary Examiner*—Milton S. Mehr
*Assistant Examiner*—V. K. Rising
*Attorney, Agent, or Firm*—Joseph W. Malleck; Olin B. Johnson

[57] ABSTRACT

A method of fabricating a lighter composite master brake cylinder is disclosed along with the resulting product. A seamless steel tube of critical thickness, closed at one end, and treated by acid etching on its exterior, is oriented vertically within a mold cavity. The tube is pretreated to contain critically dimensioned punched and coined openings for brake fluid filling and fluid delivery. Openings in the cast body are defined by pin cores aligned with the tube openings and are dimensioned to separate the edge of the tube openings from the cast opening. The tube is supported by a plug extending snuggly into the interior of said tube, said plug being joined at one end to the die walls; the cores are also supported by suitable attachment to the die walls. The tube is preheated to a predetermined temperature and molten magnesium is cast thereabout producing a compression fit about the tube as a result of solidification shrinkage; a superior metallurgical bond is created at the tube and casting interface due to surface asperities and temperature control during solidification.

7 Claims, 8 Drawing Figures

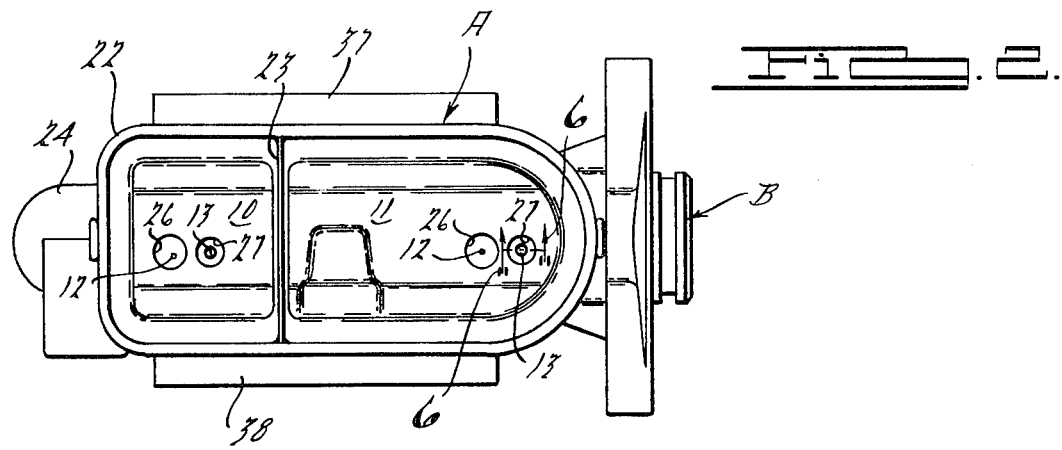
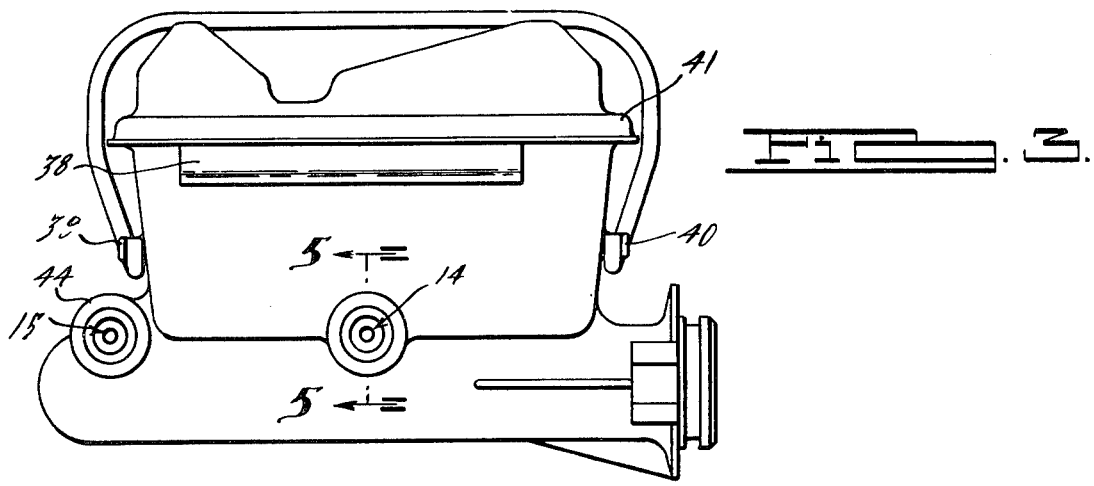
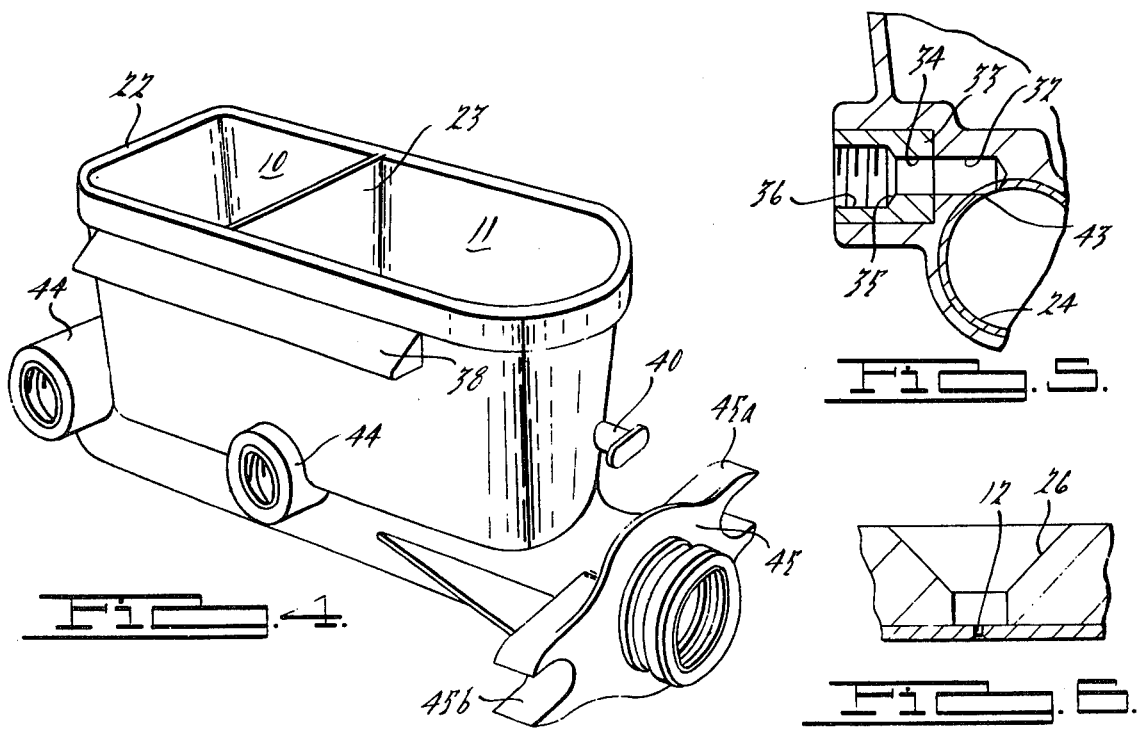

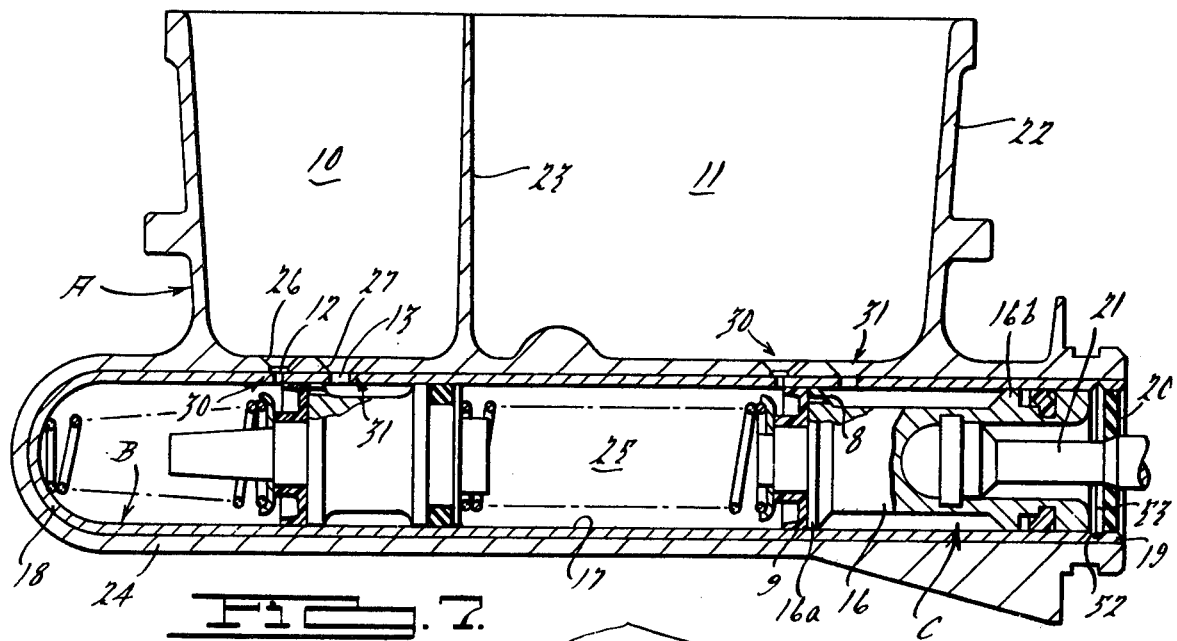
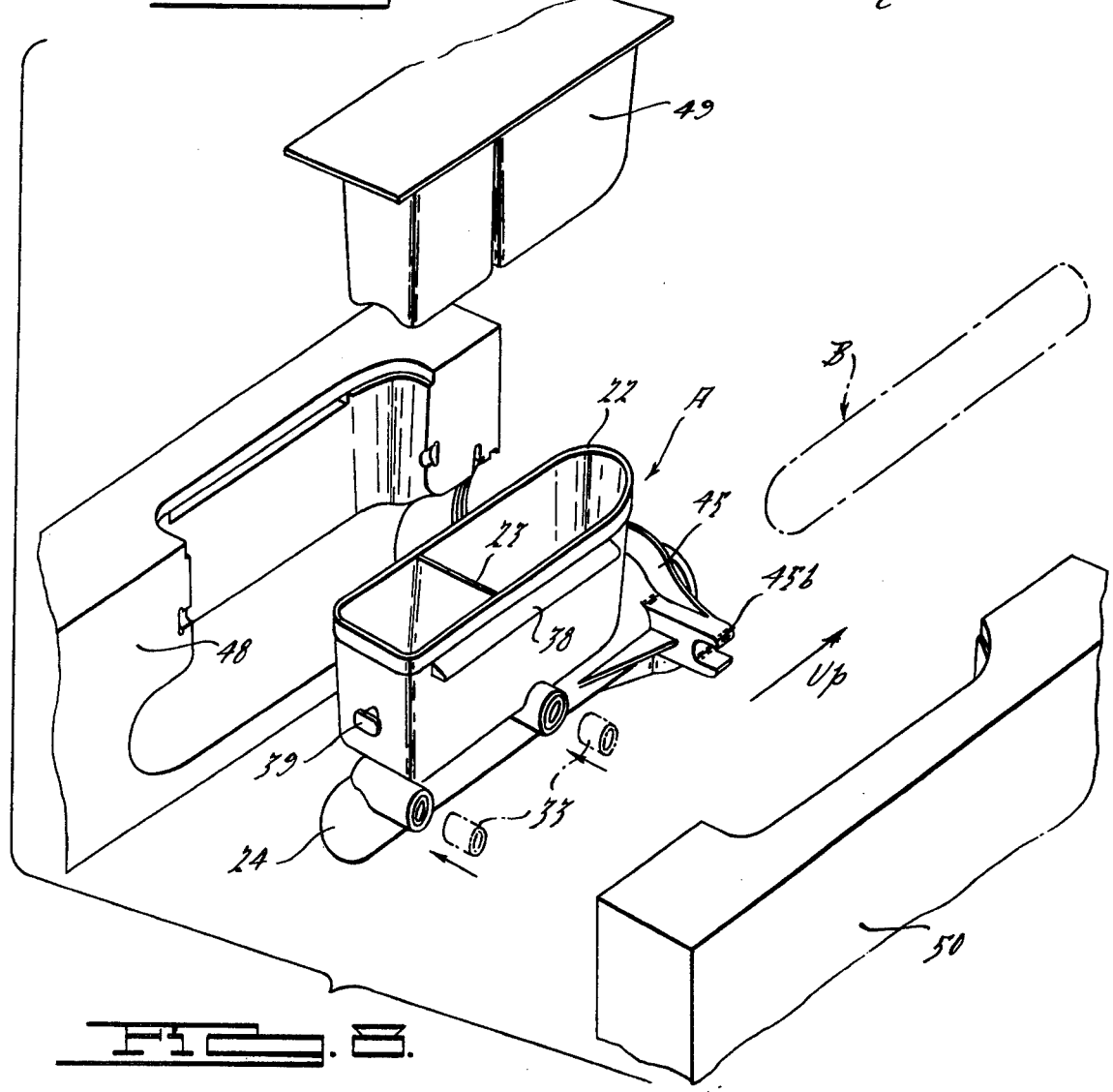

MAGNESIUM DIE-CAST BRAKE MASTER CYLINDER

BACKGROUND OF THE INVENTION

Due to the high pressures involved and limited space, master brake cylinders have been conventionally formed as relatively thick-walled but simple castings by utilizing either sand or metal cores. Whichever method or coring is employed, the critical rubbing surfaces of the master brake cylinder must be machined to eliminate scratches resulting from stripping of coring and to define a better surface against which the piston may bear. The cost of machining is one of the undesirable aspects of conventionally made brake cylinders.

To further reduce weight and avoid machining of brake cylinders, an integral composite casting would be desirable provided the high volume material of the composite is an extremely light material. However, with composites it is necessary that the heavier mass material (such as a sleeve defining the inner wall of the pressure cylinder) be bonded extremely tightly to the lighter material or element. Achieving a successful bond is complicated by (a) the metallurgical nature of the materials which may affect the bonding interface, (b) the presence of cast openings that must be defined with precision and which openings extend through both elements of the composites, and (c) a desire for high speed casting which may prohibit use of certain materials and modes of supporting the coring. Several options to the designer of a lighter composite master brake cylinder may include: steel sheet metal, aluminum die casting, plastic, and magnesium. Sheet steel is disadvantageous because of the necessity to additionally protect the exterior against corrosion and the high cost of tooling and capitalization, as well as the need for complicated welding. Aluminum die casting is disadvantageous because a galling problem may occur between the aluminum brake piston and the aluminum cylinder body; the die cast body also requires expensive anodizing. Plastic brake cylinders are disadvantageous because of the flexibility of the material in yielding to the extremely high internal pressures. Magnesium is an excellent candidate because of its low weight and ease of die casting, but presents certain process problems with respect to facilitating a bonded composite design.

SUMMARY OF THE INVENTION

The primary object of this invention is to provide an improved master brake cylinder characterized by reduced weight and the need for little or no machining.

Another object of this invention is to provide a method of making a composite master brake cylinder casting comprised of a steel tube integrally closed at one end and an outer body of magnesium.

Features pursuant to the above objects comprise (a) the preparation of a closed end steel tube including use of a certain type of acid etch to promote a satisfactory bond upon casting of the magnesium thereabout; (b) vertical orientation of the closed end steel tube with the tube mouth sealed tightly against a mold die member for die cast quality and speed; (c) preheating of the steel tube embedment during casting for promoting metallurgical affinity between said magnesium and steel tube; (d) the use closely dimensioned steel pins carried by said die walls and steel tube for defining apertures through the body walls and for aligning and supporting coring contouring said magnesium body.

SUMMARY OF THE DRAWINGS

FIG. 2 is a plan view of a master brake cylinder casting fabricated according to the principles of the present invention;

FIGS. 3 and 4 are respectively a front elevation and a perspective view of the structure of FIG. 2;

FIGS. 5 and 6 are enlarged fragmentary sectional views respectively taken substantially along line 4—4 and 5—5 of FIG. 6;

FIG. 7 is an enlarged central sectional elevational view of FIG. 2; and

FIG. 8 is an exploded view of the die members and elements of the brake cylinder casting.

DETAILED DESCRIPTION

Product

Figure 1:
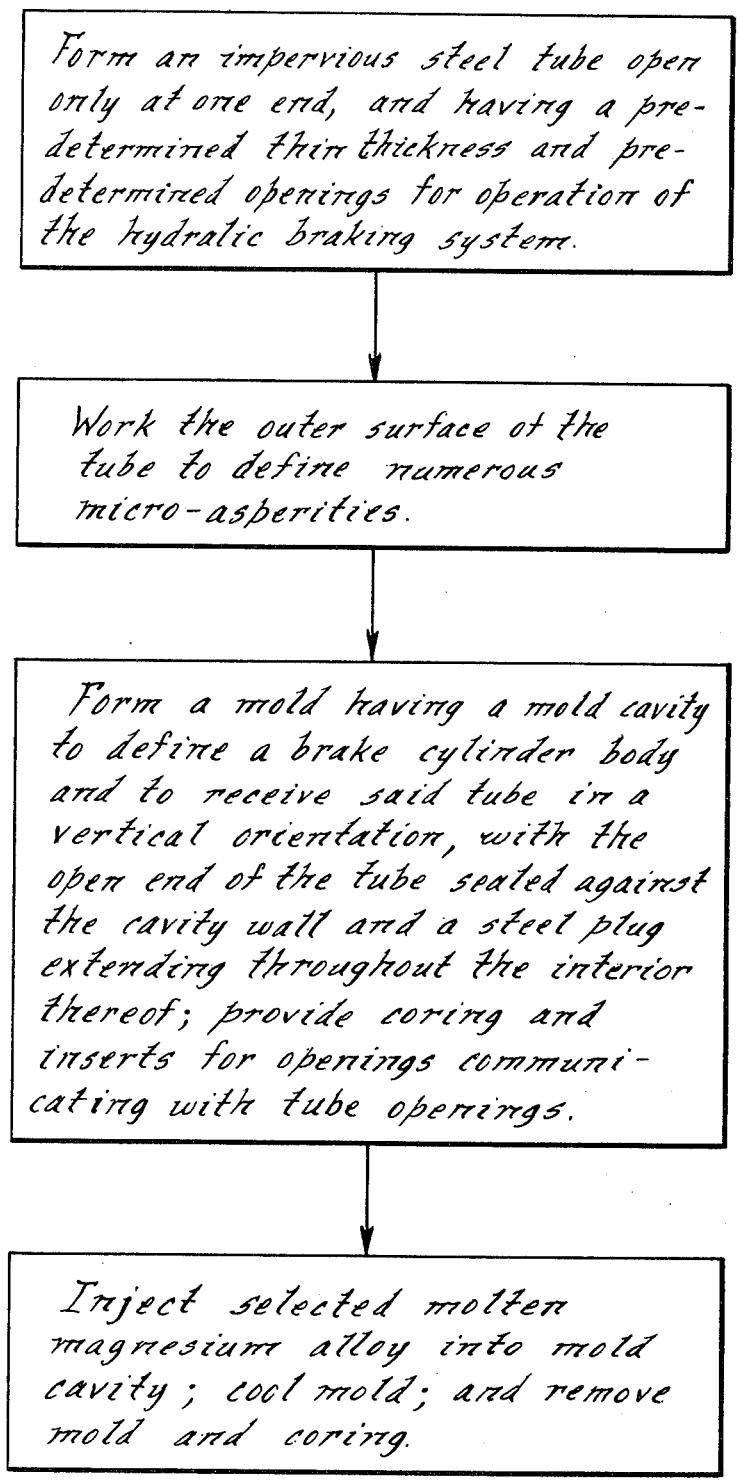
FIG. 1 is a schematic sequence of the method of the present invention.

The end product resulting from the practice of the method of this invention shall first be described (see FIGS. 2-7). The as-cast brake cylinder has a body A comprised of magnesium alloy enveloping a steel cylinder or tube B and carrying two reservoirs or chambers 10 and 11 each communicating with the interior of the tube through channels 30 and 31 for continuous filling of the tube. The body also has two brake fluid delivery channels 14 and 15 communicating with the interior of the tube B; the channels 14 and 15 threadably connect with two hoses leading respectively to the front and rear wheel braking cylinders (not shown).

A suitable piston assembly C is adapted to reciprocally operate within the interior of tube B and has a pair of aluminum piston elements 16 each carrying cylindrical flanges 16a and 16b which slidingly engage inner surface 17 of the tube; and opening 8 through flange 16a permits filling the chamber 25 during a return stroke of the piston from fluid introduced behind the piston. Differential springs 60 and 61 provide for proper sequence action of the pistons to apply pressure to the front brakes independently of the rear brakes. A sliding one-way pressure seal 9 is carried by each piston. The seal 9 exposes channels 30 and 31 when in the most retracted position (as shown). A piston rod 21 is received within a seat opening of the rear piston for slight articulation therein. The steel tube is closed at one end 18 resulting from the manner of forming the tube preferably by spinning the end margins into a closed hemi-sphere while under the proper heat conditions to obtain healing or welding of the adjoined edges. The cast body of magnesium is metallurgically bonded thereabout. The open end 19 of the steel tube is closed by a suitable element 20 premitting entrance therethrough of the brake piston rod 21.

The upstanding wall 22 and web 23 define the sides of said reservoirs; each of said wall and web have a draft angle of about 1° and an average thickness of about 0.062 inches; the wall 24 enveloping said steel closed end tube has a uniform thickness of at least .10 inches, the greater thickness serving to mechanically compress said tube as a result of slightly greater shrinkage during solidification. Each reservoir 10 or 11 communicates with the interior of said steel tube by way of said two channels 30 and 31, each comprised of a coined opening (12 or 13) and a cast opening (26 or 27), these channels supply brake fluid to chamber 25 when the piston 16 is retracted. Opening 26 along with coined opening 12 constitute the first channel 30 and serve as thermal compensator allowing slight fill of brake fluid to the master cylinder chamber 25, the opening 12 having a dimension of 0.024–0.028 inches. The second channel 31 has a larger punched and coined opening 13 which a diameter typically of about 0.07–0.075 inches. The second channel serves as a primary filling mechanism for the master cylinder 25. For purposes of facilitating respective alignment with the punched and coined openings 13 and 12 respectively, openings 26 and 27 have a conical configuration defined by an included angle of about 90° and have the narrowest dimension larger than the openings 12 or 13.

Other channels 14 and 15 communicate with the chamber 25, the latter serving to deliver pressurized fluid to the wheel brake cylinders. Each channel communicates with a separate zone of the chamber 25, one front and one aft. Each channel is defined by a punched opening 43 in the tube, (see FIG. 5) a cast passage 32 (tangent to the wall 24 of the tube) and a non-ferrous plug 33 having a central passage 34 aligned with cast passage 32; each plug is enclosed by a cast cylindrical wall 44 and has defined therein a conical tube seat 35 which receives a compression coupling (not shown) there against. The coupling is threaded into the plug at threads 36 and connects a delivery hose or tube leading to either the front or rear wheel brake cylinders.

An attachment bracket flange 45 is integrally cast about the open end of cylindrical wall 24; flange 45 has yokes 45a and 45b defined at opposite ends thereof.

The outer surface of the cast body A has defined thereon a pair of longitudinally extending shoulders 37 and 38 which serve as an abutment for clamping a temporary closure over the reservoir chambers 10 and 11 while they are being filled with brake fluid under pressure. The nodes or stops 39 and 40, located at opposite ends of the body, serve as catches for clips which clamp in place the permanent cover 41 of the master brake cylinder.

Method

A preferred method for fabricating the composite master brake cylinder comprises essentially the following steps, see flow diagram of FIG. 1:

(a) forming a steel tube having a smooth interior cylindrical surface, the tube being closed at one end, the tube having a predetermined thin thickness and having a plurality of openings disposed at predetermined locations for transferring fluid in conformity with conventional brake operations;

(b) working the outer surface of said steel tube to provide numerous asperities thereon;

(c) forming a mold (dies 48-49-50) having a mold cavity (outlined by wall 47) adapted to receive said steel tube in substantially a vertical orientation with the mouth of the tube sealed against the mold cavity wall (die 51), the mold cavity having an inside contour to define the confituration of a brake cylinder body about said tube;

(d) injecting molten magnesium into the space between said mold cavity and about said steel tube to fill same, cooling the mold, and removing the mold.

Turning now in some detail to the steps above, and first with respect to forming the steel tube, the tube A may be formed economically with a welded longitudinal seam; the seam is machined on the interior surface of the cylinder. The end is closed by heating the tube end to a termperature permitting force welding; the end margins are spun into a hemisphere while in such heated condition and sealed by force. The thickness 42 of the tube wall is substantially uniform and in the range of 0.06–0.08 inches. The openings 12 and 13 are punched and coined to precise tolerances and located to provide a communication to the proper fluid reservoir 10 or 11. The first (13) of each pair of openings has a diameter in the range of 0.070–0.075 inches and the second (12) has a diameter of 0.024–0.028 inches. Each opening 43 is defined in the side of the steel tube disposed about 90° (viewed from the longitudinal axis of the tube) from the pairs of openings 12 and 13 previously defined. The openings 43 have a diameter of about 0.156–0.151 inches. Openings 43 are located at stations aligned adjacent the end of the tube and web 23 respectively.

In carrying out step (b) to define numerous asperities on the surface of this steel tube, a preferred mode is to subject the steel tube to an aqueous etching solution of either hydrochloric acid or sulfuric acid, the acid having a concentration of about 1:1. To carry out the wetting steps, the steel tube is closed at the open end such as by a cork to maintain the integrity of the tube inner surface. The entire exterior of the tube is pretreated by being dipped in benzene or gasoline, removed and wiped or air dried. The tube is then immersed in the acid etch solution for a period of five to ten seconds or operatively between 3–12 seconds. Lastly the tube is removed and dipped in water for washing, then rinsed and then dried. The resulting surface of the tube will be degraded with numerous microfissures created as a result of the etching. This is important for achieving the subsequent metallurgical and mechanical bond between the magnesium and steel.

Sandblasting is an alternative method by which asperities may be created within a surface, but the result of using such mode is not as successful; the asperities created by sandblasting are of a rounded character as opposed to the rather sharp and irregular configuration resulting from acid etching.

In step (c), the mold cavity is defined so that the wall 24 immediately surrounding the tube has a critically enhanced thickness of at least 0.01 inches, so that during solidification and cooling a compression fit is created about the tube B; the magnesium shrinks about the exterior surface of the closed tube promoting the metallurgical bond. The shrink will be approximately in the dimensional range of 0.03 inches on a three inch diameter The steel tube is mounted within the mold cavity by a steel plug nested snuggly in the tube A; sufficient draft must be employed to permit plug withdrawal following casting. The tube is held vertical during casting employing a bottom feed to the mold cavity. The mold cavity is defined by mold dies such as 48-49-50-51 shown in FIG. 8. The cavity should define walls 22 and 23 to be about 0.062 inches thick. Suitable pin cores are employed to define openings 26, 27 and 43 through the cast body. The pin core for opening 43 is mounted in the plug 33 which is inserted into the cavity prior to casting; the pin core extends from the plug to abut the outer curvature of tube B and be tangent to the outer surface thereof.

With respect to the injection of the molten magnesium, it is preferable to employ a magnesium alloy consisting essentially of aluminum and magnesium (alloy AZ91). Prior to injecting the molten magnesium, the steel tube should be preheated to a temperature in the range of 500°–1000 F. The preheating facilitates a metallurgical bond between the temperature sensitive molten magnesium. If preheating is not employed, a flux must be used consisting essentially of zinc chloride or ammonium chloride. The flux is deposited upon the outer surface of the steel tube and supports wetting of the outer surface of the tube by the molten magnesium.

The product resulting from practicing the above method should have a weight ratio of 1:1 between the tube and magnesium body. A magnesium composite brake cylinder, according to this invention can typically weigh approximately 1.1 pounds (casting weight only) for automotive use. The casting is characterized by the elimination of post machining and the ease of installation of the piston assembly into the interior of the brake cylinder; the latter is carried out by simply inserting a scribed groove 52 along the interior mouth of the tube B into which a snap spring 53 can be interfitted to retain the closure 20 and piston assembly.

I claim:

1. A method of making a master brake cylinder for an automobile, comprising:
    (a) forming a steel tube having a uniform cylindrical wall closed at one end, the thickness of said wall being in the range of 0.06–0.08 inches, said wall having one or more openings formed at predetermined locations with a hole tolerance of ±0.004 inches and having a smooth interior surface,
    (b) working the outer surface of said tube to provide numerous asperities thereon,
    (c) forming a mold having a mold cavity adapted to receive said tube with the open mouth of said tube sealed against a die wall, said mold cavity having an inside contour effective to form a brake cylinder body about said tube and particularly to form a continuous enveloping cast wall about said tube, said continuous cast wall having a thickness about twice as thick as the wall of said tube, and
    (d) injecting molten magnesium at a temperature of about 1,100° F. into said cavity defined by said mold and tube to fill same, cooling the mold to solidify the magnesium and removing the mold.

2. The method of making a master brake cylinder as in claim 1, in which the working of the outer surface of said tube consists of immersing the exterior of said tube in an aqueous acid etch solution, comprised of hydrochloric or sulfuric acid, in a concentration of about one to one, for a period of 5 to 10 seconds, and then removing said tube and rinsing.

3. The method as in claim 1, in which said steel tube is preheated to a temperature level of 500°–1000° F. prior to being inserted into mold and prior to the injection of molten magnesium thereinto.

4. The method as in claim 1, in which said steel tube is additionally coated with a fluxing agent consisting essentially of zinc chloride or ammonium chloride, said flux being aplied prior to being inserted in said mold and prior to casting.

5. The method as in claim 1, in which said openings within said wall surrounding said tube are defined by steel core pins supported in part by the walls defining said tube openings, said core pins being additionally supported by core elements defining other contours of the cast body.

6. The method as in claim 1, in which said mold is formed to feed molten magnesium first and only through the bottom of said cavity.

7. The method as in claim 1 in which in step (c) the tube is supported by a plug extending snuggly into the interior of the tube, said plug being oriented vertically.

* * * * *